United States Patent [19]
Bryant

[11] 3,902,218

[45] Sept. 2, 1975

[54] WIPER FOR VEHICLE LIGHTS

[76] Inventor: John J. Bryant, 359 Hawthorn, Glen Ellyn, Ill. 60137

[22] Filed: July 16, 1974

[21] Appl. No.: 488,946

Related U.S. Application Data

[63] Continuation of Ser. No. 342,789, March 19, 1973, abandoned.

[52] U.S. Cl. ........ 15/250.22; 15/250.25; 15/250.30; 15/250 A
[51] Int. Cl. ............................................. B60s 1/44
[58] Field of Search....... 15/250.01, 250.02, 250.14, 15/250.22, 250.24, 250.25, 15/250.29, 250.30, 250.36

[56] References Cited
UNITED STATES PATENTS

| | | | |
|---|---|---|---|
| 2,593,073 | 4/1952 | Trevaskis | 15/250.35 |
| 2,884,656 | 5/1959 | Bryant | 15/250.22 |
| 2,896,245 | 7/1959 | Hopponen | 15/250.23 |
| 3,704,481 | 12/1972 | Fennell | 15/250.22 |

FOREIGN PATENTS OR APPLICATIONS

| | | | |
|---|---|---|---|
| 1,545,841 | 10/1968 | France | 15/250.29 |
| 1,814,829 | 12/1968 | Germany | 15/250.36 |

Primary Examiner—Peter Feldman
Attorney, Agent, or Firm—Harness, Dickey & Pierce

[57] ABSTRACT

An elastic wiper movable in an irregular manner across and engaging substantially all areas of the lens of an automobile headlamp. The wiper mechanism requires no auxiliary lens and is adapted to directly clean the headlamp lenses and get close to and around the lens aiming bosses which project outwardly from the ordinary present day sealed beam automobile headlamps.

17 Claims, 4 Drawing Figures

PATENTED SEP 2 1975   3,902,218

INVENTOR.
John J. Bryant
BY Snow and Benno
Attys.

WIPER FOR VEHICLE LIGHTS

This is a continuation of application Ser. No. 342,789, filed Mar. 19, 1973, now abandoned.

BACKGROUND OF THE INVENTION

1. Field of the Invention

Safe night driving of automobiles requires effective lighting of the roadways by the vehicles' headlamps. The effectiveness of light beams is materially reduced as a result of winter storms. The salting of roads creates a hard light restricting film on the headlight lenses which acts as a binder for opaque dust suspended in the salt solution. Also, the heat generated by the incandescent filaments in present day sealed beams causes the lenses to dry rapidly. As the dirt on the lens loses its moisture it becomes thick and glue-like and must be removed continuously. Anyone can observe this fact by noting the four headlights of a car after a trip at night on salted highways. The two lamps which contain the low beams will be dirtier than the other lamps which contain the high beam. The low beam lamps were on all of the time and as a result became hotter. Even a slight deposit of salt will diffuse the light beam and cause an undesirable glare to oncoming traffic and of course diminishes the light available to the driver in seeing the road.

2. Description of the Prior Art

Applicant's earlier U.S. Pat. Nos. 2,884,656 and 3,072,947 disclose headlamp lens wipers which were primarily operated by wind motors. One of these prior patents shows and describes rotating wipers preferably mounted on and over auxiliary lenses. In the other patent the regular lens is provided with a post attached by adhesive or the like to the center thereof about which the wiper rotates. However, both prior patents employ fully rotating wiper elements to effect cleaning whereas in applicant's subject device the wiper is arcuately reciprocable and is designed to clean close to and around the light aiming bosses on the sealed beam lenses. The French patent of M. Trougouboff No. 1,545,841 published Nov. 15, 1968 shows another form of automobile headlight cleaner. In this French patent an elongated wiper member is drawn up and down over the face of the lens. A Technical Bulletin, 1st Edition entitled "VEHICLE VISION IMPROVEMENT SYSTEMS" No. AB 640/1 dated Mar. 1, 1969 was published by Robert Bosch Corporation, Broadview, Illinois 60153 and is that company's report on their development of vehicle headlamp cleaning systems.

SUMMARY OF THE INVENTION

The present invention relates to a new and improved wiper for vehicle lights.

An important object of this invention is to provide novel means for keeping transparent surfaces clean to insure maximum light passage in the presence of dirt and liquids.

Another important object of this invention is to provide novel irregularly movable wiper means for automobile headlamps to effect removal of snow, road salt, dirt and rain often encountered when driving.

Another and further important object of this invention is to provide novel wiper means for headlamps with aiming bosses which clean close to the aiming bosses by jumping over the bosses in their arcuately reciprocable movement.

Another important object of this invention is to provide novel movable carriers on the periphery of headlamp lenses of any shape for suspending lens filament wiper elements in their passage over forwardly projecting aiming bosses.

Still another important object of this invention is to provide two novel reciprocating carrier means on generally oppositely positioned sides of a headlight lens for holding the ends of elastic filament wiper for the lens surface.

Still another important object of this invention is to provide a driving means for reciprocating at least one of the carrier means of the above object which by manual switching is operated continuously, or intermittently on a timed basis, or in response to some predetermined amount of dirt or light shielding film as it is deposited on or near the headlight lens.

A still further important object of this invention is to provide a wiper element able to adjust its length to be tensioned across both the widest and narrowest extents of the lens.

Other and further important objects and advantages will become apparent from the disclosures in the following specification and accompanying drawings.

AS SHOWN IN THE DRAWINGS

Figure 1:
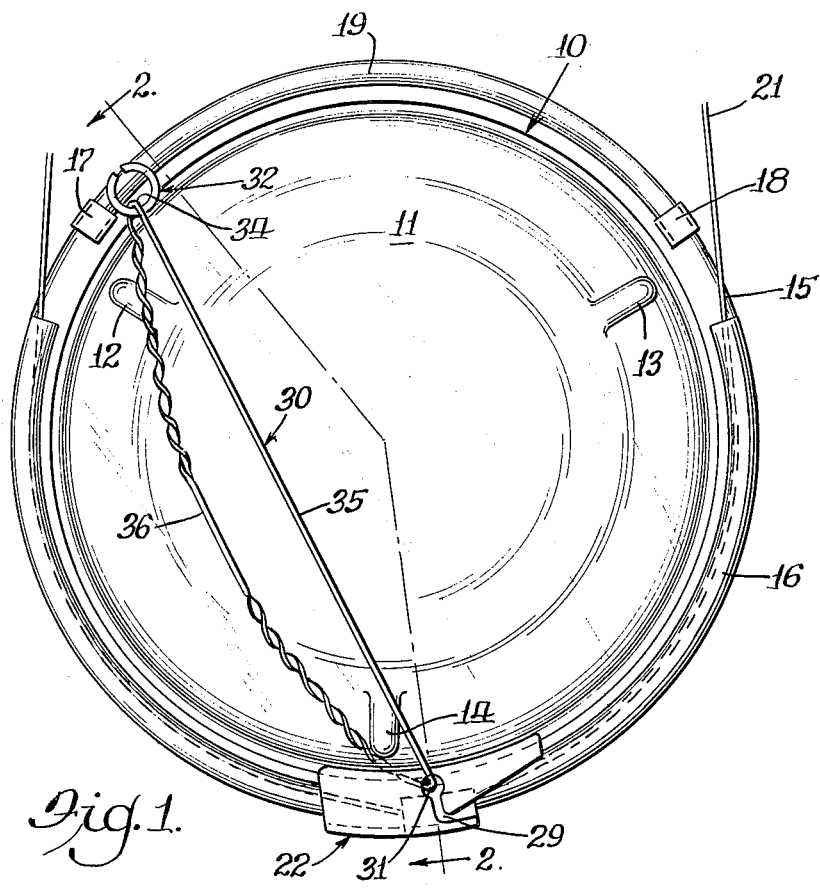
FIG. 1 is a front elevational view of an automobile headlight with the wiper mechanism of this invention attached thereto.

The reference numeral 10 indicates generally an automobile headlamp. The headlights of present day vehicles utilize what is known as sealed beam lamps. These lamps usually contain a pair of electrical incandescent filaments within a housing having a reflector to the rear and a lens on the forward end. All of these elements are preferably hermetically sealed and when inserted in a vehicle suitable conductors are merely attached to connector posts on the rear side of the housing to impart a source of electrical energy to the interior light filaments as desired. The sealed beam lamps have not been shown in detail in the accompanying drawings but the front lens, identified by the numeral 11 has been shown as it constitutes the surface to be cleaned by the wiper of this invention. The front face of the molded lens 11 which is preferably made of glass is provided with integrally molded spaced apart lens aiming bosses 12, 13 and 14. These bosses are spaced generally equidistant around the front surface of the lens as shown in FIG. 1.

The wiper mechanism of this invention is carried on an annular frame 15 which is adapted to clampingly engage the annular periphery of the lens 11 as best shown in FIG. 1. On existing headlights it would be necessary to apply a circular frame such as 15 to and around the front thereof to provide a support for the wiper mechanism to be subsequently described. On new lamps the frame 15 would be built into the housing and thereby enable a wiper to be mounted thereon.

A first arcuate track member 16 is formed as an integral part of the frame 15 and extends around the frame in a concentric manner for a distance greater then half the entire circumference of the frame and its now included lens. The track 16 is generally tubular in shape and is disposed closely adjacent the surface of the lens 11.

At another location on the circular frame 15 there is provided spaced apart integral posts 17 and 18 which project from the main body portion thereof. The outer ends of the posts 17 and 18 carry a second arcuate track member 19. The track 19 extends between the posts 17 and 18 and is spaced from the first arcuate track member 16. The track member 19 is of a lesser extent than half the circumference of the frame 15 and its included lens 11. The track 19 lies in a plane parallel to the plane of the first track member 16 at a position slightly forwardly of the plane of the first track member. However, both track planes are disposed closely adjacent the lens surface and for all practical purposes could lie in the same plane. In fact the wiper carriers (to be subsequently described) movable on the track members are substantially in the same plane of movement. The object is to locate the track so it guides the respective carriers so that they hold the lens wiping element against the lens and including the outermost edges. Similar to the track member 16 the track member 19 is generally tubular in shape as clearly shown in FIG. 2.

Figure 2:
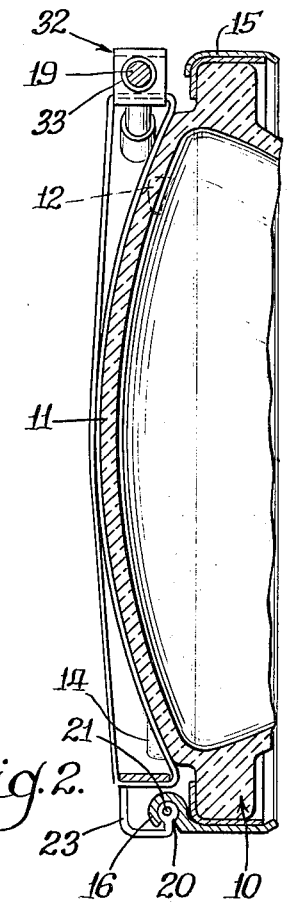
FIG. 2 is a sectional view taken on the line 2—2 of FIG. 1.

The tubular track 16 is open along its outer side as shown at 20 in FIG. 2. The remainder of the tube is greater than semi-cylindrical for the purpose of securely holding therewithin a flexible cable 21. The cable 21 is generally round in cross section to accommodate sliding engagement within the open sided tube 16.

A carrier 22 is mounted for sliding movement externally of the first track member 16. A connector 23 joins the carrier 22 and the flexible cable 21 as best shown in FIG. 2. It is thus apparent that the carrier 22 will be moved along the track member 16 when the flexible cable 21 is moved. The cable 21 is preferably remotely driven. A frame support 24 is provided on the vehicle at some position not too far from the location of the headlight. The frame support 24 is equipped with spaced apart pulleys 25 and 26. The annular pulley grooves lie in a single plane and receive an endless drive belt 27. At least one of the pulleys 25 and 26 is rotatably driven by a motor means (not shown). A connector 28 joins one point of the flexible cable 21 to the belt 27. As the belt 27 is driven in one direction only the flexible cable 21 is reciprocated thereby causing the carrier 22 to move along the open sided tubular track 16 from one extreme end to the other extreme end.

The carrier 22 is equipped with a key hole shaped open slot 29 which is adapted to receive and hold one end of an endless flexible, elastic filament 30. An end loop 31 of the filament 30 is shown in engagement with the key hole slot 29 in the carrier 22.

Figure 3:
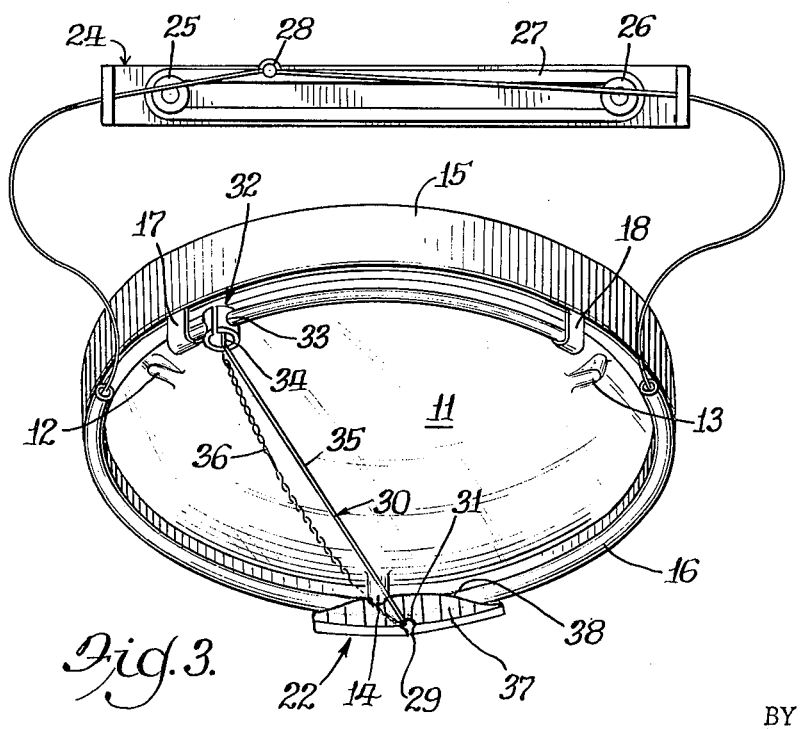
FIG. 3 is an isometric view of the device of FIGS. 1 and 2 in which the top and front thereof are clearly shown.

A second carrier 32 is journally mounted for free sliding movement along the second arcuate track member 19. The carrier is generally cylindrical in shape and comprises a split ring as depicted in FIGS. 2 and 3. Aligned holes 33 in the wall of the cylindrical carrier permit the sliding of the carrier on the exterior of the tubular track member 19. The wiper filament 30 has another looped end 34 which is held in the carrier 32. The filament shown is an endless band, but it should be understood it may be a single strand having one end attached to each carrier and function as the wiper of this invention. On the endless band shown one strand or run is shown at 35 and the other strand or run shown at 36.

OPERATION OF THE DEVICE

Figure 4:
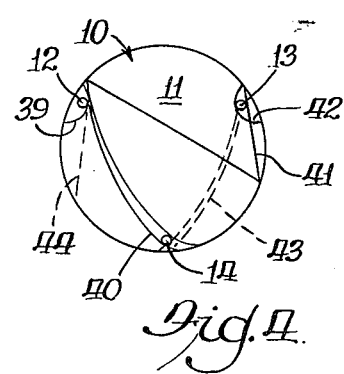
FIG. 4 is a diagrammatic showing of the many positions which the wiper filament assumes during its lens wiping operations.

The wiper motor will have provision for on and off switching so the vehicle operator may determine when he wishes his headlight lens wiped. With the motor on, the drive belt 27 carries and moves the flexible cable 21 in a back and forth manner. This in turn causes the carrier 22 to reciprocally move along the arcuate track 16 and carrying with it the looped end 31. As the carrier is thus driven it drags the two strands 35 and 36 of the endless filament over the surface of the lens 11 and clears the lens of water, snow, dirt and film. The arrangement is such that one strand 36 of the filament 30 abuts the aiming boss 14 while the other strand 35 passes over the top thereof. The carrier 22 holds the wiper element loop 31 by means of a flange 37 which is formed with a curved edge 38. The flange 37 extends inwardly axially of the light beam and is part of a cylindrical shape. The curved inner edge 38 lies closely adjacent the surface of the lens. This curved or inclined edge acts as a cam means to raise the lens wiping filament over the integral aiming bosses on the face of the sealed beam. The strand 35 is held in fixed relation to the carrier 22 by means of the slot 29. As the carrier 22 moves to the right as viewed in either of FIGS. 1 or 3 the strand 36 catches on the aiming boss 14 causing the strand 36 to move along the curved flange edge 38 and outwardly away from the surface of the lens. Continued movement of the carrier away from the aiming boss ultimately causes the previously halted strand 36 to snap over the boss 14. This snapping of the filament close to and around the aiming boss tends to cause better cleaning of the lens as well as the strand itself. The same snapping and roll over of the strands occurs on the reverse movement of the carrier 22. Also, as the carrier 22 moves toward one end of the track 16 the elastic filament wiper tends to pull the free floating carrier 32 along its arcuate track 19 generally diametrically opposite the track 16. The movement of the wiper filaments is irregular but planned for substantial full coverage of the lens surface. The endless elastic wiper filament is caused to circulate around through the carriers 22 and 32 and wear is thus distributed over the full length of the filament to thus give long service. It is pointed out that the raised aiming bosses 12 and 13 are disposed between the ends of the tracks 16 and 19. As best shown in FIG. 4 the wiper filament is very short in length and encompasses just a small corner of the lens in its position as designated by the numeral 39. In original equipment the wiper filament will preferably be positioned to the side of the lens when not in operation. Now as the carrier 22 moves in a downward swing away from the boss 12 the wiper filament stretches to a position as shown at 40. Now the carrier 22 moves up toward the aiming boss 13 and the strands are moved over the center of the lens whereupon carrier 32 is now free to snap in response to the pull of the filament 30 along its tubular track 19 and the filament assumes the relatively straight line position as shown at 41. Continued movement of the carrier 22 again reduces the length of the filament and the wiper assumes another small shape 42 on the other corner of the lens. It is thus apparent that the elastic wiper filament passes over all surfaces of the lenses in and around the aiming bosses 12, 13 and 14 and thoroughly cleans and wipes the lens with its varying velocities of movement and snapping action as above described. When the carrier 22 is driven in a reverse direction the successive positions are shown in dashed lines at 43 and then 44 before returning to its short compact position of reference numeral 39.

When the wiping filament is an endless elastic band with spaced apart strands 35 and 36 the carriers are adapted to support the looped ends of this endless band. The second wiper carrier member 32 comprises a broad hook adapted to support and separate the two strands 35 and 36 in such a manner that the tendency of one strand to turn the second wiper carrier member about the axis of the second track member is offset by the opposite tendency of the other strand so that contact of one of said strands with the outermost surface of the lens is maintained during the movements of the carrier members.

I am aware that numerous details of construction may be varied throughout a wide range and it should be understood the embodiment as disclosed herein is only one acceptable embodiment.

What is claimed is:

1. A wiper for lamps of the type having a lens comprising a supporting frame closely surrounding the lens, a first track member carried on said supporting frame near the edge of the lens, a second track member carried on said supporting frame near the edge of the lens at a position spaced from said first track member, a first wiper carrier member journally mounted for sliding movement on said first track member, a second wiper carrier member journally mounted for free sliding movement on said second track member, a wiper member constituting an elastic filament extending from said first wiper carrier member to said second wiper carrier member, and means for reciprocally moving said first wiper carrier member along said first track member from one end of the track to the other whereby the wiper member traverses and cleans substantially the full frontal area of the lens as the second wiper carrier member freely slides from one end of the second track member to the other by a pulling through the medium of the elastic filament wiper as the first wiper carrier member is reciprocally moved along the first track member.

2. The wiper of claim 1 wherein said traversing and cleaning of the lens is with a snapping action.

3. A wiper for vehicle headlamps of the type having a lens with a convex surface comprising a supporting frame closely surrounding the perimeter of the lens of a headlamp, a first track member carried on said supporting frame close to the surface of the lens and having an extent more than half of the perimeter of the surrounding frame, a second track member carried on said supporting frame close to the surface of the lens at a position spaced from the first track member and having an extent less than half of the perimeter of the surrounding frame, a first wiper carrier member journally mounted for sliding movement on said first track member, a second wiper carrier member journally mounted for free sliding movement on said second track member, a wiper member constituting an elastic member extending from said first wiper carrier member to said second wiper carrier member, and means for reciprocally moving said first wiper carrier member along said first track member from one end of the track to the other whereby the wiper member traverses and cleans substantially the full frontal area of the headlamp lens as the second wiper carrier member freely slides from one end of the second track member to the other by a pulling through the medium of the elastic wiper as the first wiper carrier member is reciprocally moved along the first track member.

4. The wiper of claim 13 wherein said traversing and cleaning of the lens is with a snapping action.

5. A wiper for vehicle headlamps of the type having a lens with a convex surface comprising a supporting frame closely surrounding the circumference of the lens of a headlamp, a first arcuate track member carried on said supporting frame close to the surface of the lens and having an extent greater than half of the circumference of the surrounding frame, a second arcuate track member carried on said supporting frame close to the surface of the lens at a position spaced arcuately from the first arcuate track member and having an extent less than half of the circumference of the surrounding frame, a first wiper carrier member journally mounted for sliding movement on said first arcuate track member, a second wiper carrier member journally mounted for free sliding movement on said second arcuate track member, a wiper member constituting an elastic member extending from said first wiper carrier member to said second wiper carrier member, and means for reciprocally moving said first wiper carrier member along said first arcuate track member from one end of the track to the other whereby the wiper member traverses and cleans substantially the full frontal area of the headlamp lens as the second wiper carrier member freely slides from one end of the second arcuate track member to the other by a pulling through the medium of the elastic wiper as the first wiper carrier member is reciprocally moved along the first arcuate track member.

6. The wiper of claim 5 wherein said traversing and cleaning of the lens is with a snapping action.

7. A wiper for cleaning the lens of a lamp, said wiper including a filament, means supporting said filament adjacent said lamp and arranged and constructed to engage the surface of said lens for cleaning substantially all areas of said lens surface in a random fashion, said means supporting said filament comprising a first carrier member for receiving one end of the filament and a second carrier for receiving the other end of said filament, means reciprocally moving the first and second carriers along the edge of the lens, said movement of said first and second carriers occurring at least partially at different times whereby the timing phase of said reciprocal movements being different, whereby the filament engagement with the lens surface varies.

8. A compact wiper for cleaning the lens of a lamp, said wiper including a flexible cleaning filament having a central portion engaging the lens to be cleaned, means supporting the end portions of the filament, said means supporting the end portions comprising first and second carrier members, said first and second carrier members separately movable along spaced apart paths conforming to the perimeter of the lens, and said first and second carrier movements causing said central portion of said filament to engage said lens from various points on the perimeter of the lens while maintaining tension in said central portion.

9. A device as set forth in claim 1 in which the wiper member elastic filament is an endless band having an end loop carried on each wiper carrier member.

10. A device as set forth in claim 9 in which said lens is equipped with forwardly projecting beam aiming bosses.

11. A device as set forth in claim 10 in which said first wiper carrier member includes an axially inwardly projecting cylindrically shaped flange with an arcuate inner edge whereby the arcuate inner edge is utilized to raise at least one portion of the endless band over at least one of the beam aiming bosses.

12. A device as set forth in claim 1 in which said first wiper carrier member includes means for receiving and holding one end of the elastic filament wiper member, said first wiper carrier member further including a fixed cam means for urging the one end of the elastic filament wiper member into contact with the outermost edge of the lens.

13. A device as set forth in claim 9 in which said second track member includes a surface of constant cross section for slidably supporting said second wiper carrier member, said second wiper carrier member comprising a broad hook member adapted to support and separate the two strands of the endless band elastic filament wiper member so that the tendency of one strand to turn the second wiper carrier member about the axis of said second track member is offset by the opposite tendency of the other strand so that contact of the one strand with the outermost surface of the lens is maintained during the movements of the carrier members.

14. In a wiper for lamps having a lens comprising a supporting frame closely surrounding the lens, a first track means carried on said support frame near the edge of the lens, a second track member having at least a portion spaced from said first track means and supported near the surface of the lens, a first wiper carrier means mounted for movement on said first track means, a second wiper carrier means mounted for free sliding movement on said second track member, a wiper member constituting an elastic filament extending from said first wiper carrier means to said second wiper carrier means and means for moving said first wiper carrier means along said first track member whereby the wiper member traverses and cleans substantially the full frontal area of the lens as the second wiper carrier means freely slides from one end of the second track member to the other by pulling through the medium of the elastic filament wiper as the first wiper carrier means is moved along the first track means.

15. The wiper of claim 14 wherein said traversing and cleaning of the lens is with a snapping action.

16. A compact wiper for lamps having a lens comprising a supporting frame closely surrounding the lens, a track means carried on said support frame near the edge of the lens, a first wiper carrier means mounted for movement on said track means, a second wiper carrier means mounted on said supporting frame, a wiper member consisting of a flexible filament extending in tension from said first wiper carrier means to said second wiper carrier means, means for traversing and cleaning substantially the full frontal area of the lens as the wiper member moves across the lens surface including means for moving said first wiper carrier means along said track member.

17. The wiper of claim 16 wherein said traversing and cleaning of the lens is with a snapping action.

* * * * *

UNITED STATES PATENT OFFICE
CERTIFICATE OF CORRECTION

PATENT NO. : 3,902,218
DATED : September 2, 1975
INVENTOR(S) : John J. Bryant

It is certified that error appears in the above-identified patent and that said Letters Patent are hereby corrected as shown below:

Column 6, line 13: "13" should be --3--.

Signed and Sealed this tenth Day of February 1976

[SEAL]

Attest:

RUTH C. MASON  
Attesting Officer

C. MARSHALL DANN  
Commissioner of Patents and Trademarks